July 1, 1969 W. E. RIGSBEE ET AL 3,453,547
MUTING DEVICE
Filed June 13, 1966
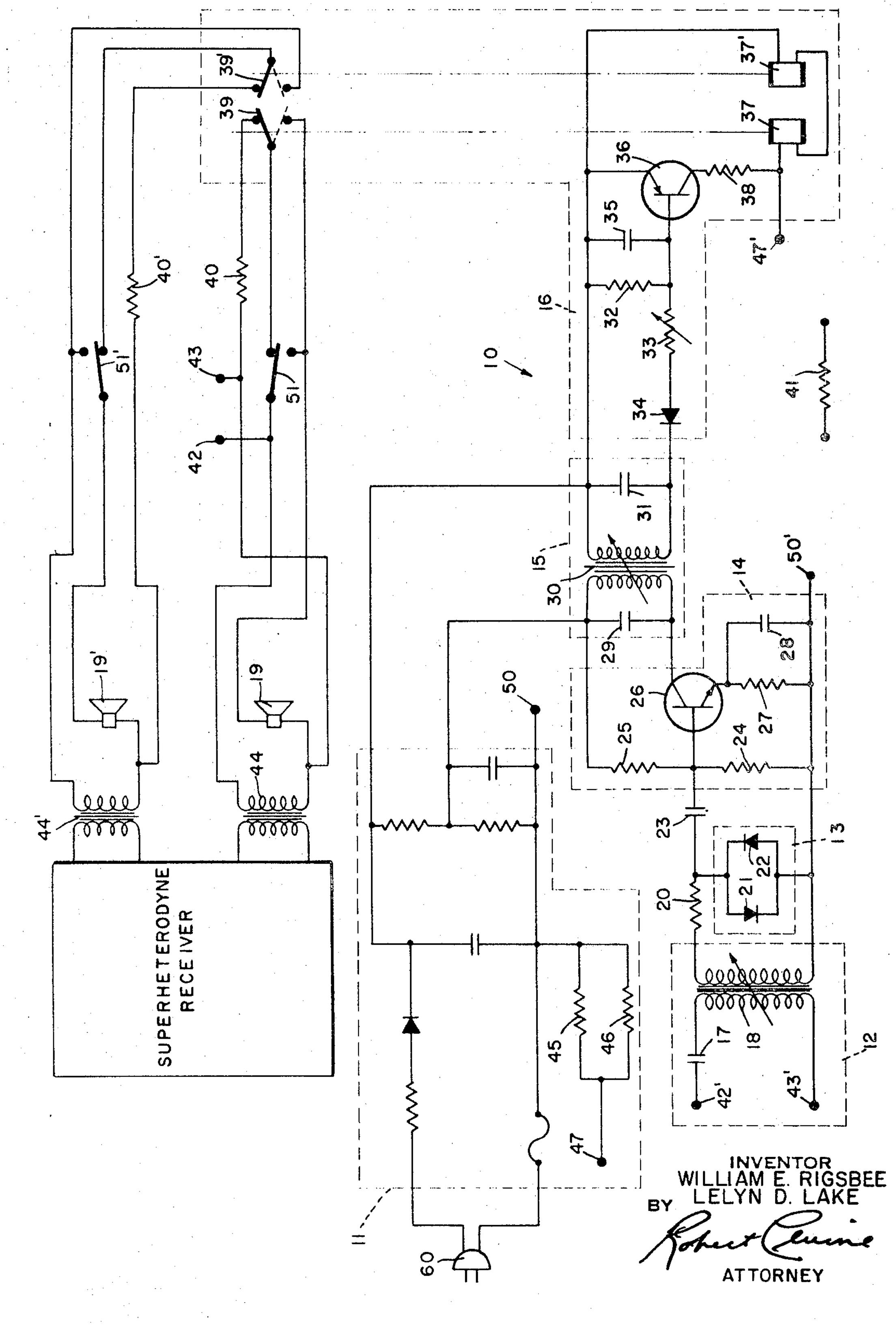
INVENTOR
WILLIAM E. RIGSBEE
LELYN D. LAKE
BY Robert [signature]
ATTORNEY United States Patent Office 3,453,547
Patented July 1, 1969

3,453,547
MUTING DEVICE

William E. Rigsbee, Indianapolis, and Lelyn D. Lake, Carmel, Ind., assignors to P. R. Mallory & Co. Inc., Indianapolis, Ind., a corporation of Delaware Filed June 13, 1966, Ser. No. 557,054
Int. Cl. H04b 1/06
U.S. Cl. 325—392 4 Claims

ABSTRACT OF THE DISCLOSURE

A radio receiver muting device that disconnects the speaker from the output transformer of the radio receiver upon receipt of a command signal from a radio transmitter.

The present invention relates to muting devices, and more particularly to a means and method for discontinuing the audible output from a speaker of a radio receiver upon receipt of a command signal of a predetermined frequency and amplitude transmitted by a radio station.

Although the present invention is adaptable for a multiplicity of uses, a particularly useful application of the present invention is found in standard superheterodyne radio receivers whereby the audible output of the receiver is terminated as long as the device of the present invention receives a command signal transmitted by a radio station.

Various types of audio frequency interruption devices for radio receivers are known in the prior art. However, most of the prior art devices are used in conjunction with alarm or warning systems. Many of the prior art devices require complicated equipment and necessarily require expensive circuit components making the resultant system impractical for mass production and mass distribution. In addition, several of the prior art devices require specific and cumbersome procedures for attachment to the radio receivers commonly used by the public. In many instances the appended circuitry impairs the operation of the cooperatively associated radio receiver and the cost of connecting the device to the radio receiver is prohibitive when compared to the benefits received. In other instances the circuitry of the radio receiver had to be modified before the appended circuitry could be connected thereto.

The present invention avoids the above difficulties by providing a simplified and inexpensive means that is appended to the audio output transformer to discontinue the audible output of the radio receiver upon receipt of a command signal from a radio transmitter.

The present invention is intended for use with a frequency modulated superheterodyne radio receiver, however, it will be understood that the device may be used in applications where remote signalling is desired or with slight modification as an alarm device. In the intended use of the invention, the FM (frequency modulated) station will send a continuous modulating command signal at a frequency of, for example, 17 kilocycles for a length of time to be coexistent with the length of time that it is desired the secondary winding of the output transformer be disconnected from the speaker of the FM radio receiver. The command signal may be initiated when the radio station begins transmitting material a listener to the station has no desire to hear, such as, for example, advertising and the like. The FM radio station could then eliminate radio receivers equipped with the muting device of the present invention from its listening audience by simply transmitting the modulating 17 kilocycle command signal. When the radio station ceased transmitting the command signal, the radio receiver would emit an audible output since the muting device no longer disconnects the secondary winding of the output transformer from the speaker. The modulating 17 kilocycle signal is received by the speaker of the radio receivers not incorporating therein the muting device of the present invention and the 17 kilocycle signal is converted to sound, however, the resultant 17 kilocycle tone exceeds the audible range of most individuals.

The following considerations must be taken into account in the performance of the radio receiver muting device of present invention: the muting device must cause switching of the output relay or relays with an input signal having an amplitude as low as 5 millivolts and as high as 5 volts at a frequency of 17 kilocycles; the relays of the muting device must assume the normal position when the modulating 17 kilocycle command signal has ceased to be transmitted by the radio station yet not be actuated by the presence of a synchronizing frequency of 19 kilocycles at about 2.5 millivolts in the muting device; and the switching of the component parts of the muting device must be accomplished over the normal extremes encountered in line voltage variations and ambient temperature variations.

Therefore, it is an object of the present invention to provide a muting device that may be easily and simply connected to the output transformer of a radio receiver.

Another object of the present invention is to provide a radio receiver muting device that disconnects the speaker from the output transformer of the radio receiver upon receipt of a command signal from a radio transmitter.

Yet another object of the present invention is to provide a radio receiver muting device which will not interfere with the normal operation of the radio receiver by overloading and/or distorting the audio output of the receiver.

Still another object of the present invention is to provide a radio receiver muting device particularly suited for use with existing radio receivers.

A further object of the present invention is to provide a radio receiver muting device that will disconnect the speaker from the secondary winding of the audio output transformer of the radio receiver upon receipt of a modulating command signal having an amplitude as low as 5 millivolts and as high as 5 volts at the input to the muting device.

Yet another object of the present invention is to provide a radio receiver muting device that is sensitive to a selected modulating command signal of determined frequency.

Another object of the present invention is to provide a radio receiver muting device having a constant output voltage with sufficient power to operate an output switching means over the entire input voltage range.

Still another object of the present invention is to provide a radio receiver muting device which is capable of receiving a command signal and uses small amounts of electrical power in the continuous operation thereof, thereby resulting in a noticeable economy of operation.

Yet still another object of the present invention is to provide a radio receiver muting device wherein a modulating command signal actuates responding circuitry of the muting device which disconnects the speaker from the secondary winding of the audio output transformer of a superheterodyne receiver thereby terminating current flow from the secondary winding of the audio output transformer to the speaker as long as the command signal is transmitted by a radio transmitter.

A further object of the present invention is to provide a radio receiver muting device which automatically actuates a relay or relays so as to disconnect the audio output transformer from the speaker of a radio receiver.

Another object of the present invention is to provide a radio receiver muting device which is simple in construction, economical to manufacture, and highly reliable in performing the functions intended.

Yet another object of the present invention is to provide a radio receiver muting device which is efficient, effective, and accurate in operation.

The present invention, in another of its aspects, relates to the novel features of the instrumentalities of the invention described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description, appended claims, and appended drawings. The invention resides in the novel construction, combination, arrangement, and cooperation of elements as hereinafter described and more particularly as defined in the appended claims.

The appended drawings illustrate an embodiment of the present invention constructed to function in the most advantageous modes devised for the practical application of the basic principles involved in the hereinafter described invention.

In the drawing there is shown a schematic representation of the muting circuit of the present invention showing the component parts thereof and the connection of the muting circuit to the secondary winding of the output transformer.

Generally speaking, the means and method of the present invention relates to a muting device for a radio receiver.

The means for muting the audio output of said receiver upon receipt of a command signal includes: power supply means for supplying the required power to muting means, an input means is connected across the speaker of said superheterodyne receiver for receiving the command signal received by the radio receiver from a transmitting station. Voltage regulating means is connected to said input circuit for clipping the peaks of said command signal so as to limit the amplitude of the command signal. Amplifying and limiting means is connected to said voltage regulating means and is used to amplify the clipped command signal and limit the amplitude of said command signal to a determined value. A tuned band-pass filter means is connected to said amplifying and limiting means and passes the amplified and limited command signal and substantially eliminates signals other than the command signal. A switching means is connected to the band-pass filter means and to the power supply. The switching means includes a normally non-conducting transistor switch and a relay means. The relay means is normally activated by current flow from said power supply thereby permitting audio sound to be emitted by the speaker of the radio receiver. The command signal biases the transistor switch to conduction so as to provide a low impedance path for the current flow from said power supply around the relay means thereby reducing the normal current flow through the relay so as to disconnect said speaker from said receiver thereby terminating the audio output of the radio receiver. Cessation of the command signal biases said transistor to non-conduction and activates the relays to said normally activated position thereby connecting said speaker to said receiver so as to allow audio signals to be emitted from said speaker.

Referring now to the drawing, the radio receiver muting device is generally indicated by numeral 10. The radio receiver muting device comprises a power supply 11, an input means 12, voltage regulating means 13, amplifying and limiting means 14, a band-pass filter and decoupling means 15 and a switching means 16.

The power supply 11 is a half-wave, capacitor-input filter rectifier type which is a common kind of power supply used in electronic applications. The power supply is connected to any suitable AC voltage source (not shown) through wall plug means 60. The features of the power supply include a high DC output voltage for a given AC input voltage, relatively low ripple output, and good output voltage regulation. The power supply is relatively light in weight because it does not require a filter choke for its operation. The AC to DC converter power supply supplies two levels of voltage, one of which provides the collector voltage for transistor 26 and the other level supplies the power in the switching means used to actuate the relays. The output of the power supply is connected to the band-pass filter and decoupling means. The ground side of the power supply is connected to one side of capacitor 28 through connected points 50 and 50′. Another power supply connection is through connected points 47 and 47′.

The input means 12 is connected across the secondary winding of audio output transformer 44 by points 42 and 43 through points 42′ and 43′ and receives the modulating 17 kilocycle command signal from the transmitting station. The input means includes a capacitor 17 connected in series with the primary winding of variable transformer 18 thereby providing an input circuit which is tuned for series resonance in the primary winding. The capacitor 17 will block effectively any DC current path through the primary winding of the transformer 18. The input circuit provides a relatively low impedance path for the 17 kilocycle signal but also provides a much higher impedance path to the lower audio frequency signals thereby preventing distortion and/or loading of the audio output of the radio receiver by the muting device. It is seen that the input circuit does not affect the tone quality or the volume level of the speaker 19 and speaker 19′. Two speakers are illustrated in the drawing, however, it should be understood that the radio receiver could function with a single speaker 19. The structure and the function of the muting device remain substantially unaltered except as described hereinlater.

The secondary winding or output winding of the transformer 18 is coupled to the voltage regulating means 13 through current limiting resistor 20. The voltage regulating means is comprised of a parallel combination of diodes 21 and 22 wherein the cathode of diode 21 is connected to the anode of diode 22. The secondary winding of the transformer 18 is wound specially so as to provide maximum output voltage at the resonant frequency of the input circuit without the necessity of including a tuning capacitor in the secondary winding of transformer 18. It was found that the distributed capacitance of the winding of the transformer was effective for this purpose. The forward resistance characteristics of the diodes are used to obtain voltage regulation of the 17 kilocycle command signal in a manner similar to that which is done with Zener diodes except that in the muting device the forward voltage characteristics of the diodes are used to regulate the voltage amplitude of the command signal.

As stated above, the parallel connected diodes effectively regulate the voltage amplitude of command signal thereby preventing swamping of the subsequent circuits connected to the voltage regulating means. However, the command signal present across the output of the regulating means is weak and the signal contains unwanted frequencies which make the signal undesirable for operating a switching means. It is seen that the weak command signal must be amplified and the unwanted frequencies must be eliminated yet the command signal must be retained.

The output waveform taken across the regulating means is fed through coupling capacitor 23 to amplifying and limiting means 14 which amplifies the waveform and thereafter limits the voltage level of the resultant waveform. The amplifying and limiting means includes a voltage divider means comprised of series connected resistors 24 and 25 connected across power supply 11. The series connected resistors are used to provide the proper bias voltage for transistor 26. The capacitor 23 is connected to the base of the transistor and to one side of resistors 24 and 25. The other side of resistor 24 is connected to the emitter of transistor 26 through resistor 27.

Connected across the resistor 27 is capacitor 28. The other side of resistor 25 is connected to the collector of transistor 26 through primary winding of transformer 30.

The amplifying and limiting means provides an output waveform that is substantially constant in amplitude with amplitude changes in the input waveform of as much as 6 to 1. The regulation of the voltage level of the signal is accomplished without the distortion in the output signal of the amplifying and limiting means normally found when the peaks of input signals are clipped during regulation of the input signal. Negative feedback is had from the emitter to the base of the transistor 26 by the use of the resistor 27, but loss of the 17 kilocycle command signal in the circuitry subsequent to amplifying and regulating means is avoided because capacitor 28 connected across the resistor 27 prevents degeneration of the 17 kilocycle command signal across the resistor.

The amplitude of instantaneous current which may flow from the base to the emitter of the transistor is dependent on the difference between the instantaneous DC voltage across the resistor 24 and the instantaneous DC voltage across resistor 27. It was found that if the value of the bias voltage across resistor 24 is slightly higher than the quiescent DC voltage across the parallel combination of resistor 27 and capacitor 28, and if the impedance combination of resistor 27 and capacitor 28 is chosen properly, the average DC voltage across resistor 27 and capacitor 28 will rise in substantially direct proportion to the 17 kilocycle command signal. It is seen that with the above described circuitry, the rise and fall of the signal current from the base to the emitter of the transistor is essentially constant even though there is an increase in the amplitude of the command signal voltage. The average collector current will be affected in a like manner and regulation of the output voltage of the tuned transformer 30 is seen. Since the amplifying and limiting means provides a constant output signal to the input of the tuned transformer 30, a sharp resonance curve is achieved.

It should be noted that the signal waveform from the base to the emitter of the transistor 26, which has a waveform resembling a rounded sawtooth waveform, is fed to the tuned transformer 30, however, the transformer 30 restores the waveform to a sinusoidal waveform. The current across the base to the emitter of the transistor is less than half-wave conduction when regulation occurs. The regulation occurs in the charge and discharge cycle of the capacitor 28. During one half cycle, the capacitor 28 discharges slightly through resistor 27 and the cycle is repeated. The sinusoidal wave is then regenerated by the resonance of the tuned transformer 30.

The capacitor 29 and the transformer 30 comprise the band-pass filter and decoupler means 15. The band-pass filter also includes a capacitor 31 connected across the secondary winding of the transformer 30. The band-pass filter substantially reduces the amplitudes of the frequencies outside the band and increases the 17 kilocycle command signal through the resonance of the double tuned transformer.

The switching means 16 includes the series combination of resistor 32, variable resistor 33 and diode 34 connected across capacitor 31. The diode 34 has its cathode connected to one side of the capacitor 31. Capacitor 35 is connected across the resistor 32. The emitter of transistor 36 is connected to one side of capacitor 35 and the base of transistor 36 is connected to the other side of capacitor 35. The collector of the transistor 36 is connected to one side of relay coil 37 through resistor 38.

The output of the tuned transformer 30 is rectified and further filtered by the diode 34 and the parallel combination of resistor 33 and capacitor 35. The rectified and filtered 17 kilocycle signal is used to supply switching current to the base of the transistor 36. The amplitude of the switching current supplied to the transistor can be adjusted by varying the resistance of variable resistor 33. The voltage level at which the transistor is biased to conduction is accurately controlled and hence the actuation of the relays 39 is accurately controlled.

The relay which is part of the switching means is normally actuated due to the DC current flowing from the power supply 11 through the parallel connected resistors 45 and 46 and series connected points 47 and 47′ to the relay coils 37 and 37′ causing the armatures 39 and 39′ to assume the dotted line positions shown in FIGURE 1. In said positions the speakers are connected across the secondary windings of the audio output transformers. When transistor 36 is biased to conduction by the 17 kilocycle signal, the transistor provides a low impedance shunt path around the relays thereby dropping the circuit flow through the relays to a level below that required to actuate the relays. The armatures then assume the heavy black line positions shown in the drawings. In these positions the secondary windings of the output transformers 44 and 44′ are disconnected from the speakers 19 and 19′ and a shunt path is provided for the signals of the secondary winding of the output transformer around the speakers. The resistors 40 and 40′ are substitued for the load that the speakers 19 and 19′ normally provide for the output transformer.

If the radio receiver has one speaker, the relay coil 37′ is replaced by resistor 41 so that the muting device may operate without further modification and in the manner described hereinbefore.

Connected between one side of the secondary winding of the transformer and the armature of the relay is a manual switch means 51 for disconnecting the muting device from the superheterodyne receiver on occasions when it is desired that AM audio output of the receiver be had as the command signal is transmitted. Any other speakers of the radio would include a manual switch means 51′ coupled in a like manner between the relay and the input transformer for disconnecting the muting device therefrom.

With the hereinbefore structural disclosure in mind and by continued reference to the drawing, the following analysis of the operation of the present invention will further serve to amplify the novelty of the muting device.

Assuming that the radio receiver is tuned to receive the transmissions of a radio station periodically transmitting a modulating command signal of 17 kilocycles to mute radio receivers tuned thereto, the 17 kilocycle command signal is received by the superheterodyne receiver and it passes through the various stages of the radio receiver to the secondary winding of the output transformer. The input circuit 12 is connected across the secondary winding through points 42 and 43. The input circuit including a broad band-pass filter passes the 17 kilocycle command signal plus other signals having about the same frequency. The signals passed by the broad band-pass filter are clipped to a predetermined amplitude so that said signals do not swamp the amplifier and limiting means 14. The means 14 amplifies the signals to a determined value and feeds the amplified signals to the narrow band-pass filter 15. The narrow band-pass filter passes the 17 kilocycle command signal and substantially reduces the amplitude of all frequencies on either side of the 17 kilocycle command signal. The 17 kilocycle command signal is fed to the input of the switch means where it is rectified and filtered and used to bias transistor 36 to conduction to thereby allow current to flow from the power supply around the relay coils 37 and 37′. With current flowing around the relay coils, armatures 39 and 39′ of the relays assume the heavy black line positions shown in the drawing thereby disconnecting the secondary windings of the audio output transformers from the speakers 19 and 19′ and thus terminating the sound being emitted from the speakers. The resistors 40 and 40′ simulate the loads of the speakers 19 and 19′.

When the transmission of the 17 kilocycle signal is terminated, the transistor 36 is biased to non-conduction and the flow of current from the power supply 11 to the relay coils resumes and the armatures 39 and 39' return to the dotted line positions shown in the drawing. When the armatures of the relays return to their normal or dotted line position, the secondary windings of the audio output transformers are connected to the speakers and sound waves are again emitted from the speakers.

While the invention is illustrated and described in an embodiment, it will be understood that modifications and variations may be effected without departing from the scope of the novel concepts of this invention and as set forth in the appended claims.

Having thus described our invention, we claim:

1. In a superheterodyne receiver, means for muting the audio output of said receiver upon receipt of a command signal comprising: power supply means; input means connected across the speaker of said superheterodyne receiver for receiving said command signal; voltage regulating means including parallel connected diodes coupled cathode to anode connected to said input circuit, said regulating means clipping the peaks of said command signal so as to limit the amplitude thereof; amplifying and limiting means including a transistor having negative feedback from emitter to base and a capacitor connected to said emitter of said transistor to substantially prevent degeneration of said command signal during negative feedback connected to said voltage regulating means, said amplifying and limiting means amplifying said clipped command signal and limiting the amplitude of said command signal to a determined value; tuned band-pass filler means connected to said amplifying and limiting means for passing said amplified and limited command signal and substantially eliminating signals other than said command signal; and switching means connected to bandpass filter means and to said power supply, said switching means including a normally non-conducting transistor switch and relay means, said transistor switch having connected in series with the base thereof a variable resistor means for determining the bias voltage at which said transistor switch is biased to conduction, said relay means normally activated by current flow from said power supply thereby permitting audio sound to be emitted by said speaker, said command signal biasing said transistor switch to conduction so as to provide a low impedance path for said current flow from said power supply around said relay thereby reducing said current flow through said relay so as to disconnect said speaker from said receiver thereby terminating said audio output, cessation of said command signal biasing said transistor to non-conduction and activating said relay to said normally activated position thereby connecting said speaker to said receiver.

2. In a superheterodyne receiver, means for muting the audio output of said receiver as claimed in claim 1, wherein said input means includes a broad band-pass filter, said filter including a capacitor coupled to the primary winding of a variable transformer, the secondary winding of said transformer coupled to said regulating means.

3. In a superheterodyne receiver, means for muting the audio output of said receiver as claimed in claim 1, wherein said band-pass filter means includes a variable resonance tuned transformer having a capacitor coupled across the primary winding thereof and having a capacitor coupled across the secondary winding thereof, said resonance tuned transformer regenerating said command signal.

4. In a superheterodyne receiver, a means for muting the audio output of said receiver as claimed in claim 1, wherein said band-pass filter means includes a variable resonance tuned transformer having a capacitor coupled across the primary winding thereof and having a capacitor across the secondary winding thereof, said resonance tuned transformer regenerating said command signal.

References Cited

UNITED STATES PATENTS 1,941,067 12/1933 Armstrong -------- 325—392 X

KATHLEEN H. CLAFFY, *Primary Examiner.*

D. L. RAY, *Assistant Examiner.*